United States Patent [19]

Abe

[11] Patent Number: 5,041,913

[45] Date of Patent: Aug. 20, 1991

[54] IMAGE SENSOR CROSSTALK CANCELLING METHOD

[75] Inventor: Tsutomu Abe, Kanagawa, Japan

[73] Assignee: Fuji Xerox Co., Ltd., Tokyo, Japan

[21] Appl. No.: 479,686

[22] Filed: Feb. 14, 1990

[30] Foreign Application Priority Data

Feb. 14, 1989 [JP] Japan .................................. 1-32698

[51] Int. Cl.$^5$ ...................... H04N 3/14; H04N 5/335; H01J 40/14
[52] U.S. Cl. ........................ 358/213.15; 358/213.11; 358/213.18; 250/208.1; 351/32
[58] Field of Search ...................... 358/213.24, 213.15, 358/213.16, 213.19, 213.17, 213.11, 213.18, 213.26, 213.27, 213.28, 213.23, 482, 483, 340; 250/578.1, 211 R, 211 J, 208; 357/24 LR, 30 H, 30 Q, 30 K, 30 G

[56] References Cited

U.S. PATENT DOCUMENTS

| | | | |
|---|---|---|---|
| 3,800,078 | 3/1974 | Cochran et al. | 358/213.15 |
| 3,800,079 | 3/1974 | McNeil et al. | 358/160 |
| 4,607,168 | 8/1986 | Oritsuki et al. | 250/208.1 |
| 4,628,211 | 12/1986 | Ruppert | 250/208.1 |
| 4,634,886 | 1/1987 | Hatanaka et al. | 250/208.1 |
| 4,742,239 | 5/1988 | Nakagawa et al. | 250/208.1 |
| 4,764,682 | 8/1988 | Swartz | 258/208.1 |
| 4,858,022 | 8/1989 | Suzuki | 358/471 |
| 4,889,983 | 12/1989 | Numano et al. | 250/211 J |

FOREIGN PATENT DOCUMENTS

| | | | |
|---|---|---|---|
| 0069277 | 4/1986 | Japan . | |
| 0020479 | 1/1987 | Japan . | |
| 0020480 | 1/1987 | Japan . | |
| 0070565 | 3/1988 | Japan | 358/213.15 |
| 0114251 | 5/1988 | Japan | 358/213.15 |
| 0238384 | 9/1989 | Japan . | |

Primary Examiner—Tommy P. Chin
Assistant Examiner—Safet Metjahic
Attorney, Agent, or Firm—Finnegan, Henderson, Farabow, Garrett, and Dunner

[57] ABSTRACT

An image sensor comprises a linear image sensor including several blocks of photo sensing elements, switching elements connected to the photo sensing elements respectively, and common signal lines connected to the blocks of photo sensing elements. In a crosstalk cancelling method for the image sensor, a dimensionless value representing the width of variation of the output signal due to crosstalk is defined as a gradation reproduction rate, and the sensor output is corrected according to the gradation reproduction rate. The gradation reproduction rate is determined irrespective to the total number of photo sensing elements; that is, it is determined only by layout of the wiring conductors. Therefore, by arranging the matrix wiring conductors which are electrically equal to one another in the effect of crosstalk, the crosstalk with the matrix wiring conductors can be generally evaluated and controlled irrespective of the design, and the output from which the effect of crosstalk is eliminated can be provided by simple operation.

3 Claims, 5 Drawing Sheets

IMAGE SENSOR CROSSTALK CANCELLING METHOD

BACKGROUND OF THE INVENTION

This invention relates to a method of correcting the image output of a contact type image sensor used for the image input section of a facsimile, image scanner or the like, and more particularly to a crosstalk cancelling method of cancelling or eliminating an effect of crosstalk attributing to matrix wiring in an image sensor in which the photo sensing element forming the image sensor is divided into a plurality of blocks, and a switching element is utilized to perform a matrix drive for each block.

A contact type image sensor is made up of a photo sensing array having a plurality of photo sensing elements arranged in a line, and a drive circuit for driving the photo sensing arrays. Electric charges induced in the photo sensing elements are applied to one output line in a time-series mode by means of a switch which selects the photo sensing elements one after another. In order to drive the plurality of photo sensing elements forming the photo sensing array, it is necessary to provide a number of driving IC chips. In order to eliminate this difficulty, a TFT driven image sensor has been proposed in the art in which processing is carried out in a parallel mode with a-Si thin film transistor (hereinafter referred to as "TFT", when applicable) used for switching several picture elements simultaneously, whereby the number of driving IC chips is reduced, and the manufacturing cost is reduced as much.

Figure 5:
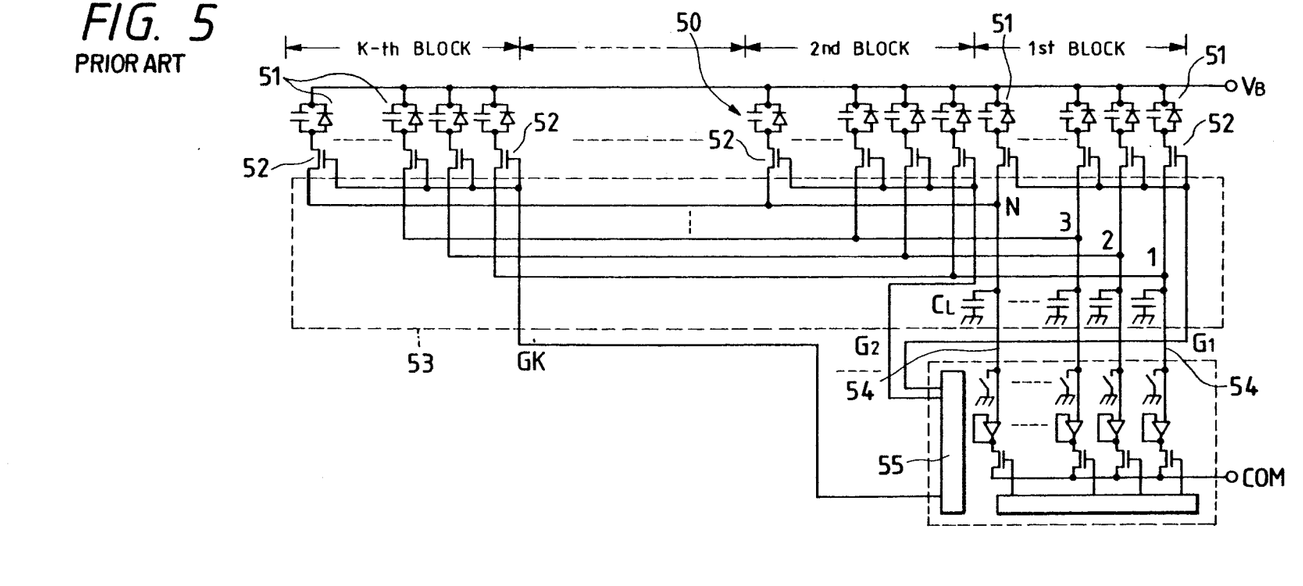
FIG. 5 is an equivalent circuit diagram of the TFT driven image sensor.

In the TFT driven image sensor, as shown in FIG. 5, a photo sensing element array 50 in the form of a line equal in length to the width of an original is divided into K blocks of photo sensing elements. Each block includes N photo sensing elements 51. The photo sensing elements 51 are connected to the drain electrodes of TFTs 52, respectively. The source electrodes of the TFTs 52 are connected through a matrix circuit 53 to N common signal lines 54 in such a manner that the source electrodes of the first TFTs 52 in the K blocks are connected to the first common signal lines, the source electrodes of the second TFTs 52 in the K blocks are connected to the second common signal lines, and so forth. The gate electrodes of the TFTs 52 are connected to a gate pulse generating circuit 55 so that; more specifically, in each block, the gate electrodes of the TFTs are connected to a connecting point which is connected to the gate pulse generating circuit, so that in each block, the TFTs are rendered conductive simultaneously. The charges produced by the photo sensing elements 51 are accumulated for a predetermined period of time, and then applied to the common signal lines 54 successively according to the blocks with the TFTs 52 used as charge transferring switches so as to be led to an input terminal COM of an analog multiplexer.

Figure 6:
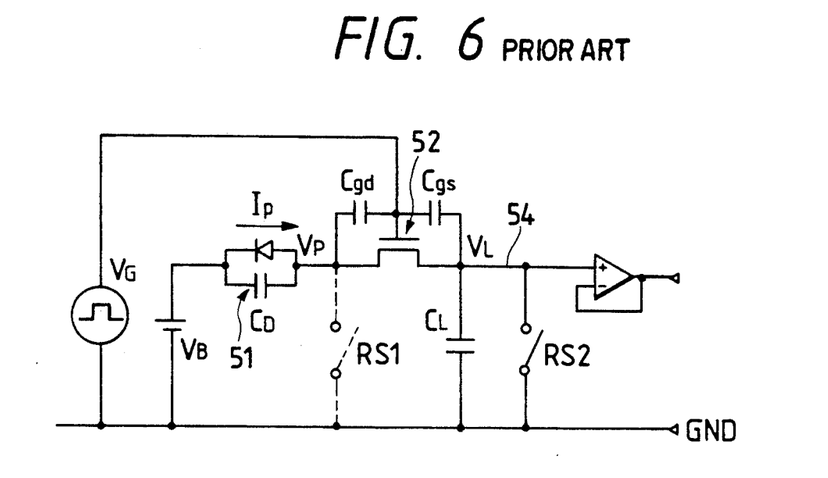
FIG. 6 is an equivalent circuit diagram of a part of the image sensor which corresponds to one picture element.

The operation will be described with reference to FIG. 6 which is an equivalent circuit for one picture element including one photo sensing element 51. Initially, reset switches RS1 and RS2 are closed. As a result, a reverse bias voltage (VB) is applied to a photo-diode PD forming the photo sensing element 51, and the potential (VL) of the common signal line 54 is reset to 0 V. When an original (not shown) placed on the photo sensing element array is irradiated by a light source (not shown), the light reflected therefrom is applied to the photo-diode PD, the capacitors (CD and Cgd) on the photo-diode side are charged by the photocurrent Ip produced according to luminance signals corresponding to the densities (light and dark) of the original. After the capacitors are charged for a certain period of time, the TFT 52 is rendered conductive (turned on) by a signal VG outputted by the gate pulse generating circuit to electrically connect the photo-diode PD to the common signal line 54, so that the capacitors are discharged; that is, the charge is transferred. Since the signal input to the multiplexer is of high impedance in the potential detection method, all the charge is stored in the circuit capacitors. Accordingly, the transferring of charge means the redistribution of charge between the capacitors (CD and Cgd) on the photo-diode side and the capacitors (CL and Cgs) on the common signal line side. Thereafter, the potential VL of the common signal line 54 provided after the transferring of charge is detected, and the potential of the common signal line 54 is reset by the reset switch RS2 to transfer the picture elements signal of the next block.

Figure 7:
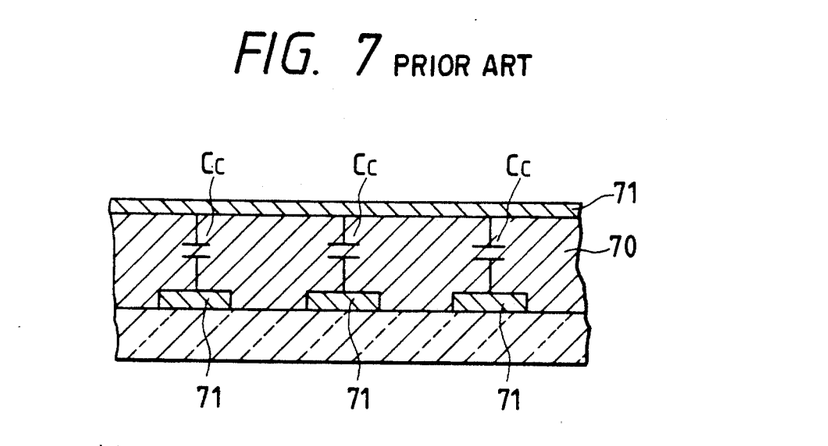
FIG. 7 is an explanatory diagram showing coupling capacitors in a matrix circuit.

In the above-described TFT driven image sensor, the matrix circuit 53 is formed by a thin film forming method as shown in FIG. 7; that is, a plurality of conductors 71 are arranged using an insulating film 70 by multi-layer wiring. This structure of the matrix circuit involves the following difficulties: Since the conductors are arranged in matrix form in the multi-layer wiring, they are extended across one another, so that coupling capacitors Cc are formed at the intersections of the conductors 71. The number of intersections is (N−1) in each of the common signal lines (N is the number of common signal lines). Therefore, when the charges are transferred from the photo-diodes PD through the TFTs 52 to the inherent capacitors (wiring capacitance) CL of the common signal lines 54, the coupling capacitors Cc are also charged due to the potential differences between the common signal lines. As a result, the charges accumulated in the fixed capacitors (wiring capacitance) CL cause variable crosstalk phenomena, so that the charges provided by the photo-diodes cannot be accurately applied to the input terminal COM of the analog multiplexer.

SUMMARY OF THE INVENTION

In view of the foregoing, an object of this invention is to provide a crosstalk cancelling method in which a gradation reproduction rate is defined which is a dimensionless value representing the width of variation of an output signal caused by crosstalk, and according to the gradation reproduction rate, the output potential of an image sensor is corrected.

The foregoing object of the invention has been achieved by the provision of the following image sensor crosstalk cancelling method for an image sensor which comprises: a linear image sensor including several blocks of photo sensing elements, each block having N photo sensing elements; switching elements connected to the photo sensing elements, respectively; and N common signal lines connected, in matrix form, to the blocks of photo sensing elements in which the switching elements are rendered conductive separately for each of the blocks so that charges optically produced in the photo sensing elements are transferred to the common signal lines separately for each of the blocks, thereby to read an image:

In a matrix wiring, signals different in magnitude are produced for one and the same input signal because of crosstalk. In this operation, the magnitude of the output signal is determined by the potentials of the common signal lines other than the selected common signal line. The gradation reproduction rate is defined as the dimensionless value representing the width of the variation of the output which is caused by the crosstalk. The gradation reproduction rate is VI/VII where VI is the potential of the selected common signal line when maximally affected by the crosstalk, and VII is the potential of the same common signal line when not affected by the crosstalk.

More specifically, VI is the potential of the common signal line i which, when charges produced in the photo sensing elements in light state are accumulated only in the common signal line i which is one of the common signal lines, and the remaining common signal lines are in dark state, is affected by the crosstalk of the remaining common signal lines; and VII is the potential of the common signal line i when charges produced in light state are accumulated in all of the common signal lines.

And when the potentials of the common signal lines affected by the crosstalk are represented by $V_i$ ($i=1$ through n), a potential $V_{i0}$ with the effect of crosstalk eliminated is as follows:

$$V_{i0} = \{(N-1)/(NR-1)\}V_i + \sum_{i=1}^{n} \{(R-1)/(NR-1)\}V_i$$

This equation is utilized to correct the output potential of the image sensor.

The above-described gradation reproduction rate R is determined irrespective of the total number of photo sensing elements; that is, it is determined by layout of the matrix wiring.

In the invention, employment of the gradation reproduction rate provides the following effects: By arranging the matrix wiring conductors which are electrically equal to one another in the effect of crosstalk although being different in geometrical arrangement, the crosstalk with the matrix wiring can be generally evaluated and controlled irrespective of the design, and the output from which the effect of crosstalk is eliminated can be provided by simple operation.

DETAILED DESCRIPTION OF THE INVENTION

One embodiment of this invention will be described with reference to the accompanying drawings.

Figure 1:
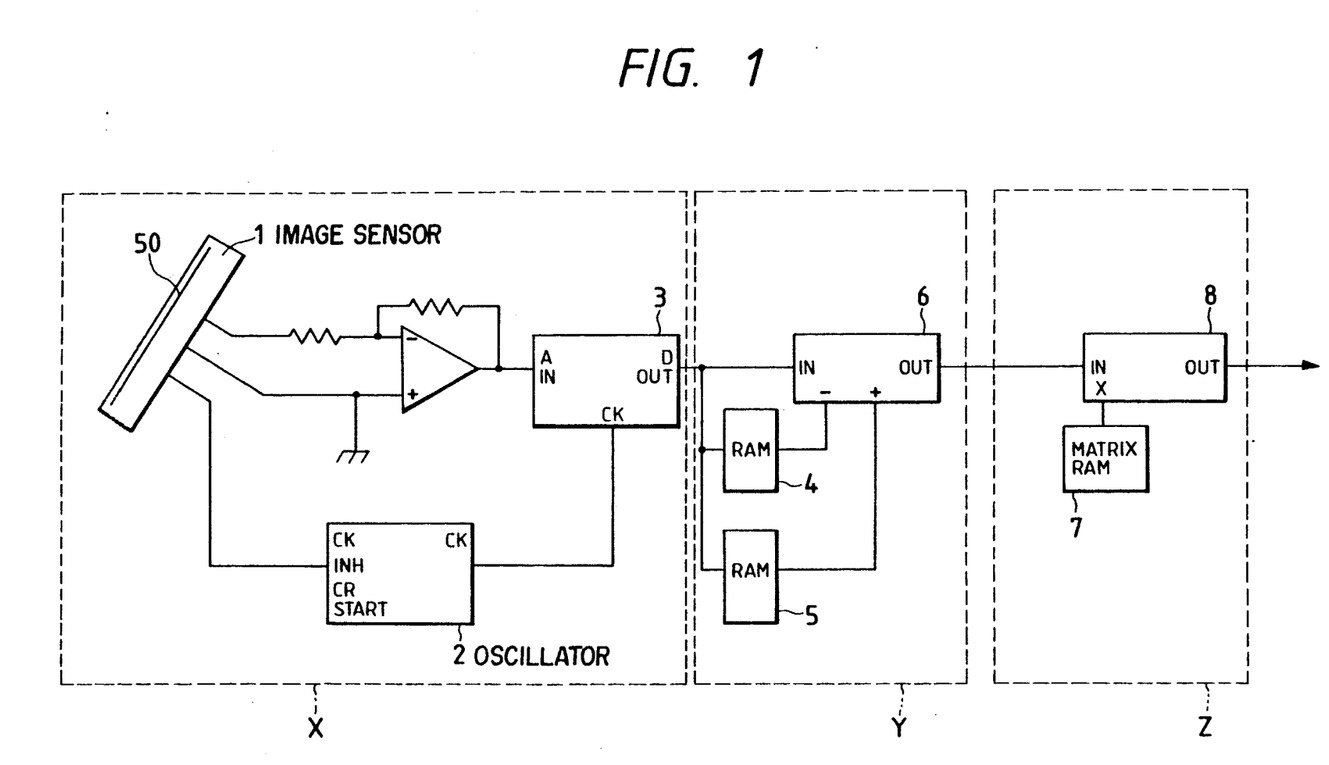
FIG. 1 is a block diagram showing the entire arrangement of an image sensor to which the technical concept of this invention is applied.

FIG. 1 is a block diagram showing the entire arrangement of an image sensor according to the embodiment of the invention. The image sensor comprises: a TFT sensor drive section X; a shading correcting circuit section Y; and a crosstalk cancelling circuit section Z.

Figure 2:
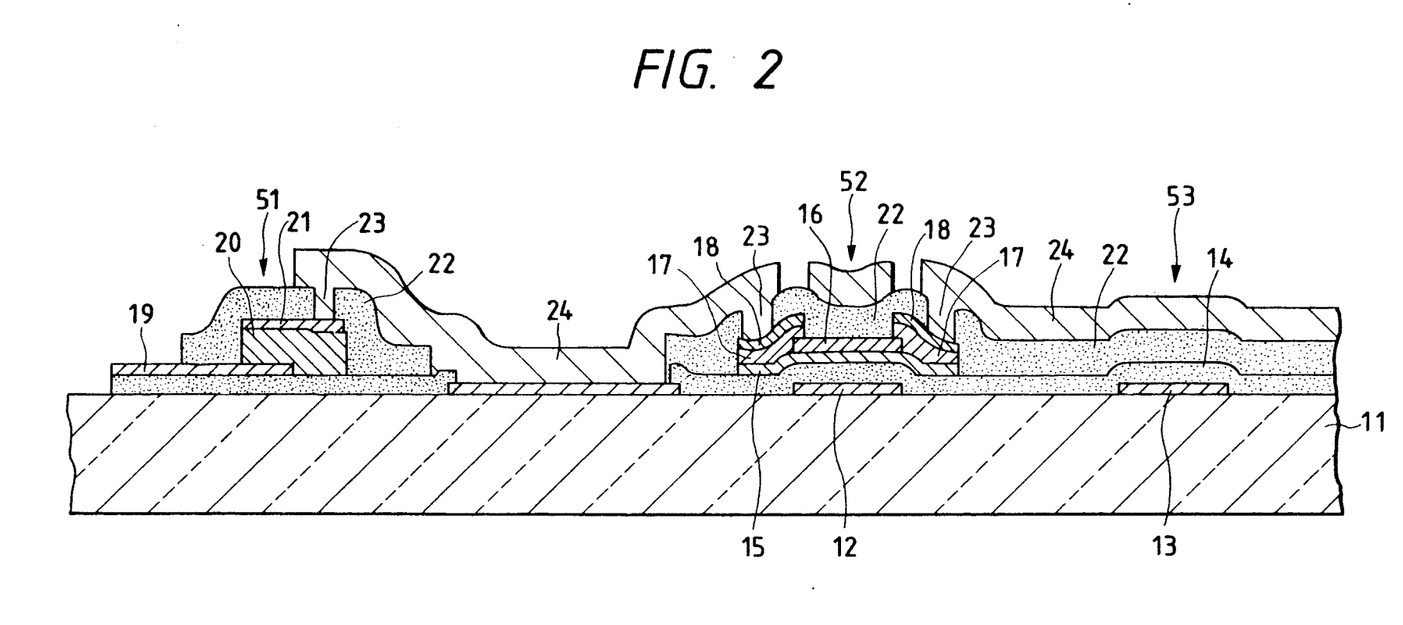
FIG. 2 is a sectional view showing a TFT driven image sensor.

The TFT sensor drive section comprises: a TFT driven image sensor 1 including an image sensor which has a linear photo sensing element array 50 and TFTs connected to the photo sensing elements, and an IC chip (not shown) for driving the image sensor; an oscillator 2 for supplying a drive signal to the IC chip; and an A-D (analog-to-digital) converter 3 for converting sensor output signals into digital signals. The TFT driven image sensor 1 is formed as shown in FIG. 2. That is, photo sensing elements 51, TFTs 52 and a matrix circuit 53 are formed on a substrate 11 by photo-lithographic etching.

More specifically, the gate electrodes 12 of the TFTs 52 and the conductors 13 of the matrix circuit which are extended in the direction of the sensor array are formed by etching chromium (Cr) by photo-lithography. and then a b-Si Nx layer 14 is formed. Thereafter, an a-Si layer 15, a t-SiOx layer 16 determining a channel length, and an n+a-Si layer 17 and a chromium layer 18 which will be a source electrode and a drain electrode are formed on each gate electrode 12 in the stated order, to form the TFTs. Simultaneously when the chromium layer 18 is formed, a chromium layer 19 is formed which is used as a common electrode of the photo sensing element 51, and an a-Si layer 20 for a photo-conductive layer, and an ITO layer 21 for individual electrodes are formed in the stated order, to form the photo sensing element array. Thereafter, the TFTs 52, the wiring conductors 13, and the photo sensing elements 51 are covered with a poly-imide layer 22, and, for each bit, wiring conductors 24 is formed on the polyimide layer 22 by patterning aluminum. The wiring conductors 24 are connected to the photo sensing elements 51 and the source and drain electrodes of the TFTs 52 through contact holes 23.

The equivalent circuit of the TFT driven image sensor is similar to that of the conventional one which is shown in FIG. 5. That is, the linear photo sensing elements array comprising several blocks of photo sensing elements is matrix-driven separately for each of the blocks. Each block has N photo sensing elements, which are connected through a matrix circuit 53 to N common signal lines 54. When the TFTs 52 are rendered conductive (turned on) selectively in each block, the charges produced by the photo sensing elements are transferred to the common signal lines 54 separately for each of the blocks, to read the image.

The matrix circuit 53, as shown in FIG. 2, is of a dual layer structure permitting multi-layer wiring. Therefore, cross talk occurs at the intersections of the upper and lower conductors forming the matrix circuit. The crosstalk is caused by the fact that signal charges are accumulated between the conductors according to the ratio of the coupling capacitance Cc of the wiring to the inherent capacitance (wiring capacitance) CL of the wiring. In order to simplify the crosstalk, the matrix circuit 53 is made electrically symmetrical in wiring layout, and the coupling capacitances Cc at the intersections of the wiring conductors and the inherent capacitances CL are uniformly distributed over the common signal lines 54; that is, a crosstalk correction equation (described later) is simplified.

The shading correcting circuit section Y in FIG. 1 is used for an ordinary sensor output processing operation; that is, it is made up of RAMs 4 and 5 and a digital arithmetic unit 6, to correct a light output and a dark output.

The crosstalk cancelling circuit Z comprises a matrix RAM 7 and a matrix arithmetic unit 8. In the crosstalk cancelling circuit Z, a sensor output signal is corrected according to a correcting equation corresponding to the bits stored in the matrix RAM 7 in advance, thereby to eliminate the effect of the crosstalk which is caused by the multi-layer wiring structure of the TFT driven image sensor.

Now, provision of the correcting equation stored in the matrix RAM 7 will be described.

As was described above, with matrix wiring, signals different in magnitude are produced for the same input signal because of crosstalk. Therefore, for provision of the correcting equation, a dimensionless value representing the width of variation of an output signal attributing to crosstalk will be defined as a gradation reproduction rate R.

The magnitude of the output signal is determined from the potentials of the common signal lines other than one selected therefrom. With the one common signal line selected from the plurality of common signal lines, it is assumed that the common signal line has a potential VI when affected maximally by crosstalk. The potential VI can be represented as a potential which is provided on the one common signal line when the charges produced in the photo sensing elements in light state are accumulated in the one common signal line only, and the remaining common signal lines. And it is assumed that the common signal line has a potential VII (i.e., a potential of the common signal line when the charges produced in light state are accumulated in all the common signal lines) when not affected by crosstalk. Then, the gradation reproduction rate R can be represented by the following equation (1):

$$R = VI/VII \tag{1}$$

Figure 3:
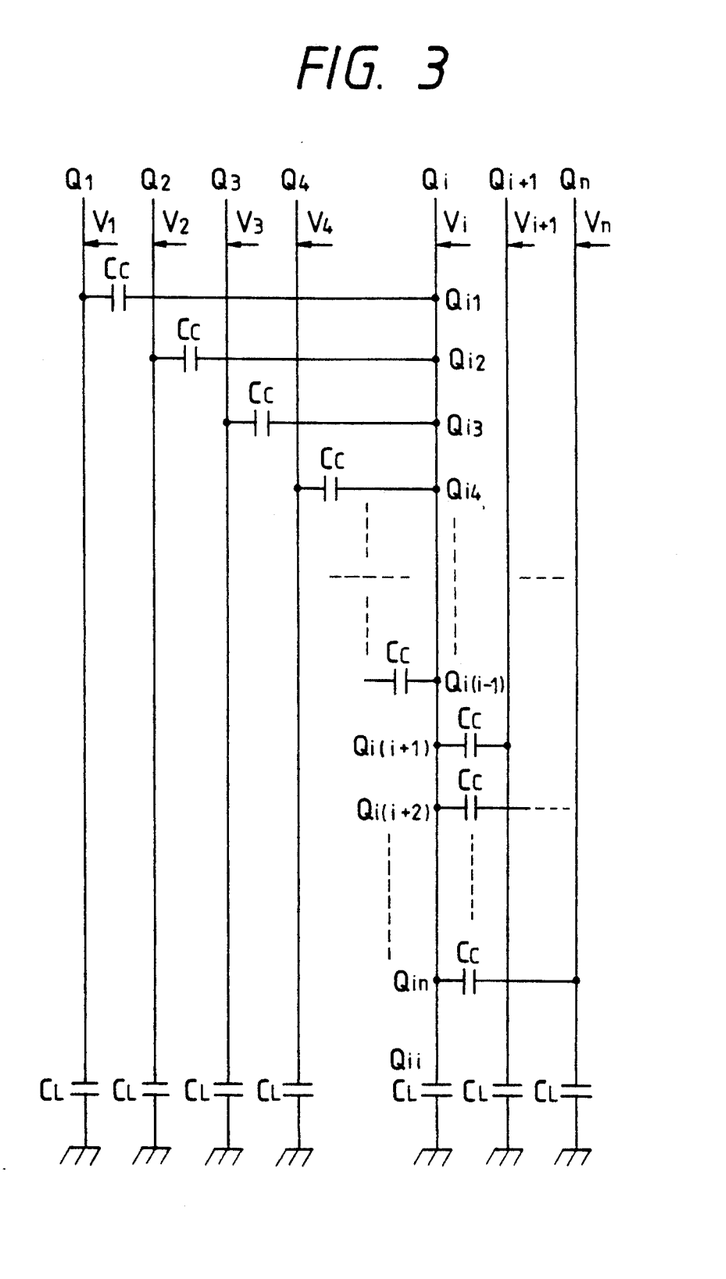
FIG. 3 is an equivalent circuit diagram of a matrix.

The crosstalk is caused by the coupling capacitors between wiring conductors, which are mainly the coupling capacitors Cc formed at the intersections of the wiring conductors in the dual layer wiring structure. As was described above, the matrix circuit 53 formed is electrically symmetric, and therefore in the matrix circuit 53, the inherent capacitances CL of the wiring conductors and the coupling capacitances Cc between the wiring conductors are uniformly distributed. Hence, an equivalent circuit of the matrix circuit 53 and the common signal lines 54 connected thereto is shown in FIG. 3. Let us select one out of the N common signal lines, namely, a common signal line i, and consider the potential of the common signal line i. Since the common signal lines are arranged symmetrically, the remaining common signal lines are at the same potential ($V_1 = V_2 = V_3 = \cdots = V_n$, where n is not i). Therefore, the charge $Q_i$ accumulated in the common signal line i is distributed to the charges $Q_{ii}$ accumulated in the inherent capacitors CL and the charges $Q_{ij}$ ($j \neq i$) accumulated in the coupling capacitors Cc formed between the common signal line i and the remaining (N−1) common signal lines. Therefore, because of the charge storage law, $$\begin{aligned} Q_i &= \text{(the charge in } CL \text{ of the signal line } i) + \\ &\quad \text{(the charges in } CL \text{ and } Cc \text{ of the} \\ &\quad \text{remaining signal lines)} \\ &= Q_{ii} + Q_{i1} + Q_{i2} \cdots + Q_{ij} \\ &= CL\, V_i + Cc\, (V_i - V_1) + \\ &\quad Cc\, (V_i - V_2) + \ldots + Cc\, (V_i - V_n) \\ &= CL\, V_i + \Sigma Cc\, (V_i - V_j) \end{aligned} \tag{2}$$

When expressed in matrix, $$\begin{bmatrix} Q_1 \\ Q_2 \\ \cdot \\ Q_i \\ \cdot \\ \cdot \\ Q_n \end{bmatrix} = \begin{bmatrix} a & b & \ldots & \ldots & b \\ b & a & \ldots & \ldots & b \\ \ldots & \ldots & \ldots & \ldots & \ldots \\ b & b & \ldots a & \ldots & b \\ \ldots & \ldots & \ldots & \ldots & \ldots \\ \ldots & \ldots & \ldots & \ldots & \ldots \\ b & \ldots b & \ldots & \ldots & a \end{bmatrix} \begin{bmatrix} V_1 \\ V_2 \\ \cdot \\ V_i \\ \cdot \\ \cdot \\ V_n \end{bmatrix} \tag{3}$$

In Equation (3), $$a = CL + (N - 1)\, Cc$$

$$b = -Cc.$$

With inverse matrix of both sides of Equation (3), $$\begin{bmatrix} V_1 \\ V_2 \\ \cdot \\ V_i \\ \cdot \\ \cdot \\ V_n \end{bmatrix} = \begin{bmatrix} \alpha & \beta & \ldots & \ldots & \beta \\ \beta & \alpha & \ldots & \ldots & \beta \\ \ldots & \ldots & \ldots & \ldots & \ldots \\ \beta & \beta & \ldots \alpha & \ldots & \beta \\ \ldots & \ldots & \ldots & \ldots & \ldots \\ \ldots & \ldots & \ldots & \ldots & \ldots \\ \beta & \ldots \beta & \ldots & \ldots & \alpha \end{bmatrix} \begin{bmatrix} Q_1 \\ Q_2 \\ \cdot \\ Q_i \\ \cdot \\ \cdot \\ Q_n \end{bmatrix} \tag{4}$$

where $\alpha = \{1 + (Cc/CL)\}/[CL\{1 + N\,(Cc/CL)\}]$
$= \{1 + \gamma\}/\{CL\,(1 + N\gamma)\}$ where $\gamma = (Cc/CL)$
$\beta = (Cc/CL)/CL\{1 + N\,(Cc/CL)\}$
$= \gamma/\{CL(1 + N\gamma)\}$ where $\gamma = (Cc/CL)$.

Equation (4) is solved with assumption of the worst crosstalk condition. That is, when the charge Qo is accumulated in one common signal line only, the potential VI of the common signal line is as follows:

$$\begin{aligned} VI &= [(1 + \gamma)/\{CL\,(1 + N\gamma)\}]Qo \\ &= \{(Qo/CL)(1 + \gamma)\}/(1 + N\gamma) \end{aligned} \tag{5}$$

When no crosstalk is taken into account, the potential VII of the common signal line is determined by the accumulated charge Qo and the inherent capacitance CL as follows:

$$VII = Qo/CL \tag{6}$$

From Equations (5) and (6), $$R = VI/VII \quad (7)$$
$$= \{(Q_o/CL)(1 + \gamma)/(1 + N\gamma)\}/(Q_o/CL)$$
$$= (1 + \gamma)/(1 + N\gamma)$$

From Equations (1) and (7), $$R = (1+\gamma)/(1+N\gamma). \quad (8)$$

The ideal potential $V_{iO}$ (i=1 through n) provided when no crosstalk occurs is determined by the charge $Q_i$ stored in each common signal line and the inherent capacitance CL thereof ($Q_i = CL\ V_{io}$). Therefore, by dividing both side of Equation (3) by CL, then $$1/CL \begin{bmatrix} Q_1 \\ Q_2 \\ \cdot \\ Q_i \\ \cdot \\ \vdots \\ Q_n \end{bmatrix} = \quad (9)$$

$$1/CL \begin{bmatrix} a & b & \ldots & \ldots & b \\ b & a & \ldots & \ldots & b \\ \ldots & \ldots & \ldots & \ldots & \ldots \\ b & b & \ldots & a & \ldots & b \\ \ldots & \ldots & \ldots & \ldots & \ldots \\ \ldots & \ldots & \ldots & \ldots & \ldots \\ b & \ldots & b & \ldots & \ldots & a \end{bmatrix} \begin{bmatrix} V_1 \\ V_2 \\ \cdot \\ V_i \\ \cdot \\ \cdot \\ V_n \end{bmatrix}$$

and $$\begin{bmatrix} V_{10} \\ V_{20} \\ \cdot \\ V_{i0} \\ \cdot \\ V_{n0} \end{bmatrix} = \begin{bmatrix} A & B & \ldots & \ldots & B \\ B & A & \ldots & \ldots & B \\ \ldots & \ldots & \ldots & \ldots & \ldots \\ B & B & \ldots & A & \ldots & B \\ \ldots & \ldots & \ldots & \ldots & \ldots \\ B & \ldots & B & \ldots & \ldots & A \end{bmatrix} \begin{bmatrix} V_1 \\ V_2 \\ \cdot \\ V_i \\ \cdot \\ V_n \end{bmatrix}$$

In Equation (9), $$A = \{CL + (N - 1)\ Cc\}/CL$$
$$= 1 + (N - 1)\gamma$$
$$B = -Cc/CL$$
$$= -\gamma$$

Accordingly, when with the following n-th order matrix equation stored in the RAM 7, the potential $V_i$ of each common signal line 54 is calculated by the matrix arithmetic unit 8 according to Equation (9), then the potential $V^{io}$ with effect of the cross talk eliminated can be obtained.

$$D = \begin{bmatrix} A & B & \ldots & \ldots & B \\ B & A & \ldots & \ldots & B \\ \ldots & \ldots & \ldots & \ldots & \ldots \\ B & B & \ldots & A & \ldots & B \\ \ldots & \ldots & \ldots & \ldots & \ldots \\ \ldots & \ldots & \ldots & \ldots & \ldots \\ B & B & \ldots & \ldots & A \end{bmatrix}$$

Equation (9) can be expressed as a general equation as follows:

$$V_{io} = \{1 + (N - 1)\gamma\} V_i = \sum_{i=j} \gamma V_j \quad (10)$$

$$V_{io} = (1 + N\gamma) V_i = \sum_{i=1}^{n} \gamma V_i$$

From Equation (8), $\gamma = (1 - R)/(NR - 1)$. Therefore, with the gradation reproduction rate R as parameter, Equation (10) is:

$$V_{io} \approx (1 + N\gamma) V_i - \sum_{i=1}^{n} \gamma V_i$$

$$= \{(N - 1)/(NR - 1)\} V_i + \sum_{i=1}^{n} \{(R - 1)/(NR - 1)\} V_i$$

As is apparent from the above description, the gradation reproduction rate R is independent of the total number of photo sensing elements (the number of picture element) and is determined by the number (N) of common signal lines and the inherent capacitance CL and coupling capacitance Cc of the common signal lines. Therefore, what is required is to design only one gate group; that is, the same gate group can be arranged as many as required by an image reading width, so that the matrix wiring is laid with the same gradation reproduction rate R.

In the above-described embodiment, with respect to the inherent capacitor CL and the crosstalk coupling capacitor Cc, the same structure is provided which comprises the chromium layer, SiNx layer, polyimide layer and aluminum layer as shown in FIG. 2. Therefore, $\gamma$(Cc/CL), independently of the thicknesses of the film layers forming the capacitors, is determined by the area ratio of Cc and CL only. Accordingly, the gradation reproduction rate R can be uniquely determined by the layout of matrix wiring, independent of the process parameter.

Figure 4:
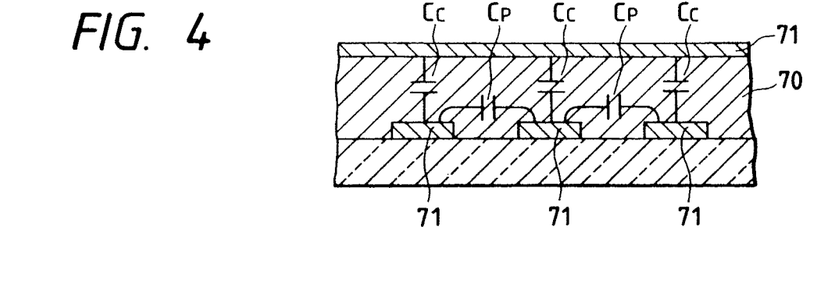
FIG. 4 is an explanatory diagram showing coupling capacitors in a matrix circuit.

In the above-described embodiment, under the condition that the coupling capacitors formed by the signal lines which cause crosstalk attribute to those formed at the intersection of the wiring conductors in the dual layer wiring structure, the gradation reproduction rate R is calculated to correct the sensor output. However, it should be noted that the crosstalk may take place by coupling capacitors Cp formed between parallel signal lines as shown in FIG. 4. In FIG. 4, parts corresponding functionally to those which have been described with reference to FIG. 7 are therefore designated by the same reference numerals or characters. The coupling capacitors Cp are smaller in capacitance than the coupling capacitors Cc; however, the values of the coupling capacitors Cp should be taken into account in the calculation of the gradation reproduction rate R in order to eliminate the effect of crosstalk more accurately. That is, in this case, in the matrix D of the correcting equation, the value of B should be rewritten. For instance in the case where coupling capacitors Cp are formed between adjacent parallel signal lines, the matrix of the correcting equation is:

$$D' = \begin{bmatrix} A & B' & \ldots & \ldots & B \\ B' & A & \ldots & \ldots & B \\ \ldots & \ldots & \ldots & \ldots & \ldots & \ldots & \ldots \\ B & B & A & \ldots & B \\ \ldots & \ldots & \ldots & \ldots & \ldots & \ldots & \ldots \\ \ldots & \ldots & \ldots & \ldots & \ldots & \ldots & B' \\ B & B & \ldots & B' & A \end{bmatrix}$$

The element B is the value which is determined from the element B with effect of the coupling capacitor (capacitance) Cp between the parallel signal taken into account.

In the case where the coupling capacitors Cp between all the parallel signal lines are taken into account, the values obtained by taking the coupling capacitors Cp into consideration should be applied to the elements B in the matrix equation D.

In the above-described embodiment, the matrix wiring conductors are laid symmetrically so that the signal lines are uniform in inherent capacitance CL and coupling capacitance Cc, whereby the matrix equation D is made simple. However, in the case where the signal lines are different from one another in inherent capacitance and coupling capacitance, the elements in the matrix equation D should be rewritten.

Grounding lines may be arranged between the parallel signal lines so that the coupling capacitors Cp be much smaller in capacitance than the coupling capacitors Cc. In this case, the effects of the coupling capacitors Cp can be disregarded.

As is apparent from Equation (8), the gradation reproduction rate R can be increased by decreasing $\gamma$(Cc/CL); that is, by increasing CL relative to Cc. For this purpose, the circuit may be modified for instance by adding capacitors to the common signal lines.

As was described above, in the crosstalk cancelling method according to the invention, the dimensionless value representing the width of the variation of the output signal due to crosstalk is defined as the gradation reproduction rate, and the sensor output is corrected according to the gradation reproduction rate. The gradation reproduction rate is determined irrespective to the total number of photo sensing elements; that is, it is determined only by layout of the wiring conductors. Therefore, by arranging the matrix wiring conductors which are electrically equal to one another in the effect of crosstalk, the crosstalk with the matrix wiring conductors can be generally evaluated and controlled irrespective of the design, and the output from which the effect of crosstalk is eliminated can be provided by simple operation.

What is claimed is:

1. An image sensor crosstalk cancelling method in which an image sensor comprises a linear image sensor including several blocks of photo sensing elements, each block having N photo sensing elements; switching elements connected to said photo sensing elements, respectively; and N common signal lines connected, in matrix form, to said blocks of photo sensing elements, comprising the steps of:

rendering said switching elements conductive separately for each of said blocks;

producing charges in said photo sensing elements;

transferring said charges to said common signal lines separately for each of said blocks to read an image;

defining a gradation reproduction rate R as VI/VII, where VI is a potential of a common signal line i of said common signal lines which, when charges produced in said photo sensing elements in a light state are accumulated only in the common signal line i, and the remaining common signal lines are in a dark state, is affected by crosstalk of the remaining common signal lines, and VII is a potential of the common signal line i when charges produced in the light state are accumulated in all of said common signal lines; and obtaining a potential $V_{io}$ with the effect of crosstalk eliminated according to the following equation:

$$V_{io} = \{(N-1)/(NR-1)\} V_i + \sum_{i=1}^{n} \{(R-1)/(NR-1)\} V_i.$$

where the potentials of said common signal lines affected by said crosstalk are represented by VI (i=1 through n).

2. The crosstalk cancelling method according to claim 1, further comprising the step of providing a matrix circuit between said blocks of photo sensing elements and said common signal lines to select signal lines from one block at a time, said matrix circuit being formed on a substrate with a dual layer structure permitting multi-layer wiring.

3. The crosstalk cancelling method according to claim 2, wherein said step of providing said matrix circuit, in order to simplify said crosstalk correction equation, comprises the substep of forming said matrix circuit to be electrically symmetrical in the wiring layout, such that coupling capacitances at intersections of the wiring conductors for said multi-layer wiring and inherent capacitances for the wiring conductors are uniformly distributed over said common signal lines.

* * * * *